Nov. 26, 1946.    R. C. WEBB    2,411,605
ELECTRICAL CIRCUITS
Filed Feb. 25, 1943
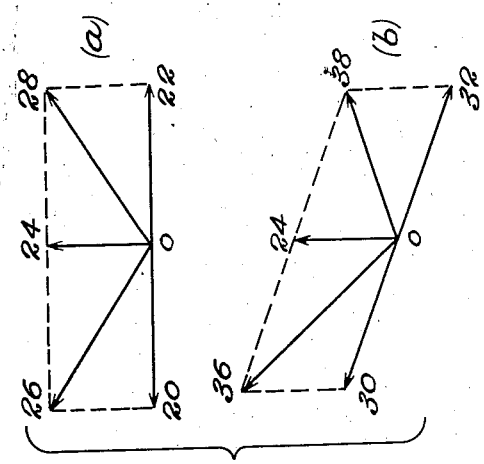
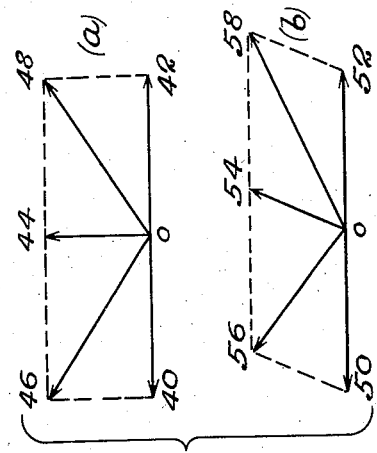
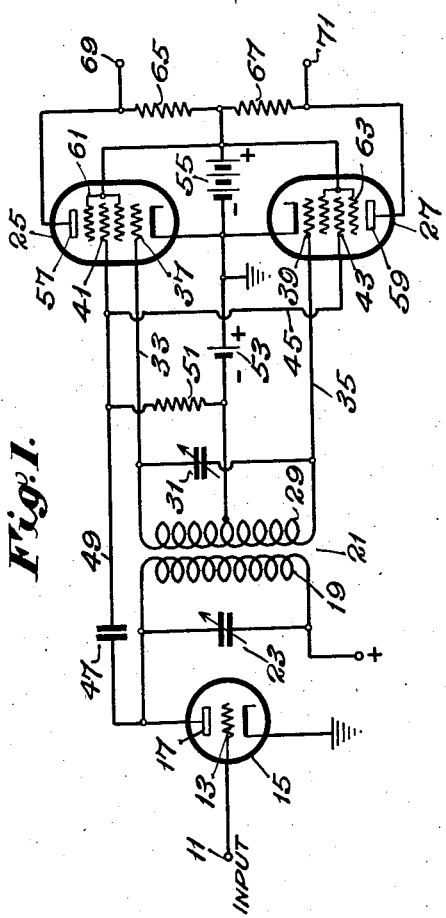
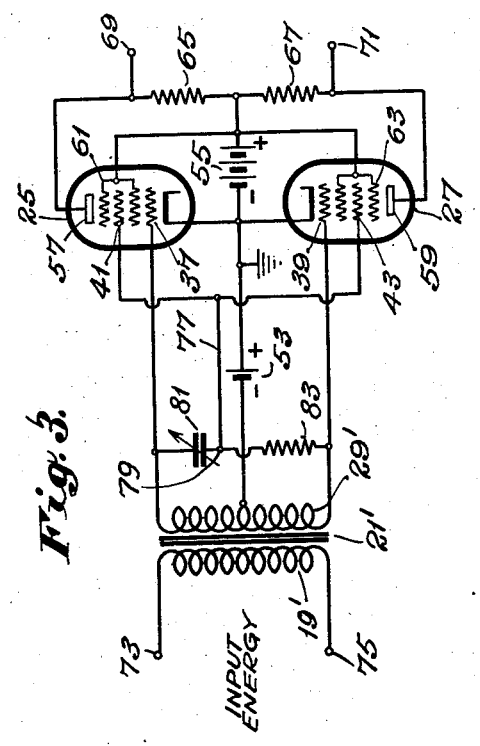
INVENTOR:
Richard C. Webb
by Samuel B. Smith
ATTORNEY.

Patented Nov. 26, 1946

2,411,605

UNITED STATES PATENT OFFICE 2,411,605

ELECTRICAL CIRCUITS

Richard C. Webb, Lafayette, Ind., assignor to Purdue Research Foundation, West Lafayette, Ind., a corporation of Indiana Application February 25, 1943, Serial No. 477,073

6 Claims. (Cl. 250—27)

This invention relates to electrical circuits, and particularly the circuits of the type for use in receiving frequency modulated or frequency shifted waves. Also, the invention finds particular application in connection with use as an automatic frequency control arrangement for radio receivers.

In one of its principal applications the invention is directed to a method and system for providing for detecting frequency modulated waves where the received energy is shifted in frequency within the audio range, and wherein the disclosed discriminator operates with substantially greater discriminator sensitivity than arrangements heretofore known.

In one of its applications the invention is particularly applicable for use in connection with systems for the remote control and guidance of aircraft and the like where energy radiations are transmitted from a ground station to an aircraft and there received in a manner to control the operation automatically and completely without the need of actual pilot control. In such systems, for example, a system of the type shown and described by the application of A. L. G. deBey, Serial No. 471,315, filed January 5, 1943, and assigned to Purdue Research Foundation, and also in deBey application, Serial No. 369,216, filed December 9, 1940, by the same inventor, arrangements were disclosed for providing suitable shifts or changes in frequency of radiated energy where the resultant frequency changes or shifts were made in accordance with the desired altitudinal angle representative of the angle of climb or descent, on the one hand, of an airplane to be controlled, or in accordance with an azimuthal control measuring the degree of turning to the right or to the left while flying in a substantially horizontal plane have been set forth.

The present invention is particularly concerned with a system and apparatus for receiving and detecting such frequency shifted waves of radiant energy for the purpose of more accurately and readily controlling the aircraft, for instance, by reason of the increased sensitivity of detection. Essentially the invention herein to be described comprises a suitably arranged pair of discriminator tubes, upon the control electrodes of which frequencies are supplied substantially 180° out of phase with regard to each other, and to the secondary control grids of which energy is supplied co-phasally on each tube with a shift in phase of the applied energy being obtained by virtue of a suitably arranged phase shifting network, with the result that a variation in output energy from each tube is derived which is proportional to the shift in phase of the applied energy on each of the control electrodes of the tube.

Accordingly, it becomes an object of my invention to provide an arrangement and circuit which will provide for detecting frequency shifted waves in a manner which is particularly sensitive, and yet simple in construction and operation.

Other advantages and objects of the invention are those of providing for detecting frequency shifted waves by relatively simple apparatus which overcomes one or more known difficulties and disadvantages of the prior art arrangements.

Other objects and advantages are those of providing a simplified circuit arrangement which may be easily set up and operated for achieving the purposes and objects of this invention.

Other objects will naturally suggest themselves to those skilled in the art when the following specification is read in connection with the accompanying drawing, and the claims appended are interpreted in accordance therewith.

In the accompanying drawing,

Fig. 1 shows one form of circuit for accomplishing the aims and objectives of the invention;

Fig. 2 comprises two graphical representations shown by the vector series (a) and (b) to explain the operation of the circuit of Fig. 1;

Fig. 3 represents a modification of the arrangement of Fig. 1 particularly sensitive to use in detecting frequency modulated waves where operation is arranged within the audio frequency spectrum; and, Fig. 4 constitutes a vector analysis of the operation of the circuit of Fig. 3, with vector series (a) and (b) showing two possible conditions of operation.

Referring now to the drawing, and first to Fig. 1 of the invention, received signal energy, after suitable amplification at intermediate frequencies for instance, and after appropriate limiting, where desired, is applied at the terminal point 11 to the control electrode 13 of the amplifier tube 15 serving to drive the discriminator. The tube 15 may be considered also in the sense of constituting a limiter for well known purposes. The output energy from the tube 15 is applied through the anode 17 to the tuned plate circuit constituting, in part, the primary winding 19 of the discriminator interstage transformer 21, with appropriate tuning provided by means of the variable condenser element 23. Tubes 25 and 27 constitute the discriminator tubes which are energized from the energy fed to the secondary winding 29 of the interstage transformer 21. Each of the discriminator tubes 25 should preferably be provided with two control grids which are nearly equally effective in controlling the plate current flowing through the tubes. For this purpose, tubes of the general character such as pentagrid converters may be used.

The secondary winding 29 of the transformer 21 is suitably tuned by means of the tuning capacitor 31, and output energy from this resonant secondary circuit consisting of the inductance of the secondary winding 29 of the interstage transformer 21 and the tuning capacitor 31 is fed by way of the conductors 33 and 35, respectively, to the #1 control grids 37 and 39 of the discriminator tubes 25 and 27, respectively.

The second control grid 41 and 43 of the tubes 25 and 27, respectively, are tied together, preferably by the conductor 45, and excited directly from the plate or anode 17 of the driver tube 15 by way of the coupling condenser 47 and conductor 49, with the condenser 47 constituting a blocking condenser and functioning in substantially known manner. The resistor element 51 serves to connect the biasing source, conventionally represented by the battery 53, to bias the grids 41 and 43 to a suitable place as an operating point within the region of plate current curvature. The plate or anode battery 55 supplies not only the operating voltage for the plates 57 and 59 of the tubes 25 and 27, respectively, but also supplies the operating voltages for the screen electrodes 61 and 63 of these same tubes. Variations in resultant output energies flowing through the tubes 25 and 27 are derived as useful plate current variations in accordance with the voltage drops produced through the resistors 65 and 67, which voltages are made available at the terminal points 69 and 71, respectively.

Considering the operation of the circuit hereinabove explained, reference may be had to Fig. 2, wherein the curve (a) represents a condition when the circuit arrangement of Fig. 1 is in balance, so that the vectors O—20 and O—22 represent the voltages applied to the control electrodes 37 and 39, respectively. It is, of course, apparent that each of these voltages is 90° out of phase with respect to the voltage represented by the vector O—24 which represents that voltage which is applied to the parallelly connected grids 41 and 43, which shift in voltage is due to the resonant transformer action of the interstage transformer 21, and naturally the currents drawn by the plates or anodes 57 and 59 of the tubes 25 and 27 will then be represented as being proportional to the vector sums of the grid voltages O—20 and O—24, on the one hand, and O—22 and O—24 on the other hand, so that these may be represented now by the vectors O—26 and O—28, respectively. Thus, the outputs from tubes 25 and 27 are equal for this condition, and a balanced condition is obtained with no useful output at terminals 69 and 71.

Referring now more particularly to curve (b) of Fig. 2, it will be seen that a condition has been represented when the applied frequency has been raised in value, for instance, so that now the voltages appearing at the control electrodes 37 and 39 will no longer be represented by vectors which are 90° out of phase with respect to the voltage represented by the vector O—24 as applied to the control electrodes or grids 41 and 43, but, due to the characteristics of the resonant circuit consisting of the transformer secondary 29 and the capacitor 31, a phase shift has occurred so that the voltage applied to the control electrode 37 may now be represented by the vector O—30, and the voltage applied to the control electrode 39 may be represented by the vector O—32. As was the case in connection with the vector series of curves of portion (a) of the figure, the plate currents flowing through the tubes 25 and 27 naturally are still proportional to the vector sums of the two grid voltages which are represented by the vectors O—30 and O—24, on the one hand, and O—32 and O—24 on the other hand, so that now it will be seen that the resultant vectors are indicated by the vector O—36 as representing the output from the tube 25, and the vector O—38 as representing the output from the tube 27.

It thus can be seen that for a condition where the frequency is increased, unequal plate currents result, and the flow of these currents through the load resistors 65 and 67 produces useful output variations. In the case where the frequency is increased, it can be seen that the output from the tube 25 becomes greater than for the tube 27, whereas for a decrease in the input frequency, the opposite condition will take place.

Since the grids of the tubes 25 and 27 are never driven positive with respect to the cathodes by reason of the bias obtained thereon through the biasing source 53, it can be seen that these tubes represent a load of substantially infinite impedance on the resonant circuit and the result is that the output characteristic approaches more closely the phase shift curve of the resonant circuit alone.

In the modified arrangement of Fig. 3, provision has been made for a discriminator circuit which is particularly adapted for operation within the audio frequency range. To this end, input signals are applied at the input terminals 73, 75 and then serve to energize the primary winding 19' of the interstage transformer 21', which is now shown particularly as an audio frequency transformer, in order to energize the secondary winding indicated as 29'. The general arrangement of the tubes 25 and 27 is somewhat similar to that shown by Fig. 1 with the control electrodes or grids 37 and 39 being energized by connection to the outer terminals of the transformer secondary 29', and the grids 41 and 43 being parallelly connected and thus energized co-phasally, as well indicated with reference to the arrangement of Fig. 1.

In connection with the arrangement of Fig. 3, however, it will be noted that the grids 41 and 43, while connected together, now connect by way of a conductor 77 to an intermediate point 79 representing the junction of the serially connected capacitor 81 and resistor 83, which together are connected in parallel with the transformer secondary 29'.

In connection with the operation of the circuit shown by Fig. 3, reference will now be made to the vector analysis represented by the vectors of Fig. 4. Referring to Fig. 4, and first to portion (a) thereof, it will be seen that the vector O—44 represents the voltage applied to the grid electrodes 41 and 43 which are parallelly connected and that such voltage will be 90° out of phase with the voltages represented by the vectors O—40 and O—42, respectively, when the applied frequency is such that the capacitive reactance of the condenser 81 is equal to the resistance of the resistor 83.

As was above explained, the plate currents flowing from the tubes 25 and 27 are proportional to the vector sums of the grid voltages, that is, for instance, the grid voltage O—44 appearing on the grid 41 and the grid voltage O—40 appearing on the grid 37 of the tube 25 will produce a plate current which is proportional to the sums of these voltages which can be represented by the vector O—46, or likewise, the plate current flowing through the tube 27 on conditions where the voltages on the grids 39 and 43 are 90° out of phase may be represented by the vector O—48. In this form and under these conditions, a balanced condition is obtained, as explained by reference to Fig. 2(a).

However, let it be supposed that the applied frequency is increased. Then it can be seen that the voltage represented by the vector O—44 that is applied to the grids 41 and 43 begins to lag and occupies now a portion represented as O—54 as in vector series (b), but the voltages heretofore represented as O—40 and O—42 by the vector series (a) occupy the same relative position and are now represented by vector series (b) as O—50 and O—52, respectively. Under such circumstances, it is apparent that the plate currents flowing from the tubes 25 and 27 are now no longer equal, but to the contrary, are unequal and are proportional now to the vectors O—56 and O—58, with that represented by the vector O—58 being larger than O—56 for the degree of phase shift introduced by reason of the voltages applied to the grids 41 and 43.

It therefore becomes apparent that when the audio frequency is either raised or lowered, the plate currents from the tubes 25 and 27 become unequal, and that one plate current is increasing while the other is decreasing. The result is that voltage drops are produced across the resistors 65 and 67 which now become useful in providing output variations. It, of course, might be apparent that the general arrangement of the condenser and resistor serially connected could be replaced by other reactive combinations in order to provide the desired effects, and then suitable tuning such as shown, for instance, by Fig. 1 might be applied across the transformer secondary 29' as there indicated also.

While the invention has been described in such a manner that one signal is placed upon one control electrode and the other signal is placed upon the other control electrode of each tube, it, of course, will be apparent that the input signals in the normal 90° phase relationship may be applied to either of the control electrodes where the parameters or geometry of the tubes 25 and 27, for instance, are such that either of the control grids 37 or 41, on the one hand, and 39 and 43 on the other hand are equally effective in controlling the electron flow between the cathode and anode elements of the tube. Under such circumstances it is apparent that one signal might be applied to one control electrode and the other signal applied to the other control electrode interchangeably, and consequently the connections to each of the tubes might be different but only so long as each control electrode is equally effective in its operation.

Other modifications naturally will become apparent and suggest themselves at once to those skilled in the art in the light of the invention set forth by the following claims.

Having described the invention, what is claimed is:

1. A circuit for detecting frequency modulated signal energy comprising a pair of thermionic tubes each having an output electrode element connected to a common load circuit and at least two signal actuated control electrodes, means for supplying frequency modulated signal energy in 180° out-of-phase relationship to one control electrode element of each tube, means for supplying the frequency modulated signal energy cophasally upon a second control electrode element of each tube with the supplied signal energy normally shifted 90° in phase relative to the signal energy supplied to the first control electrode element of each tube, and phase shifting means comprising a serially connected capacity and resistance element operative upon a shift in the frequency of the supplied signal energy for altering the relative phase differences of the signal energy applied to the first and second control electrode elements of each tube to produce thereby output energy of varying magnitudes from each tube.

2. A detector circuit comprising a pair of multielectrode thermionic devices each having a plurality of input and control circuits and a single output circuit, means to supply frequency modulated signalling voltages to one like input circuit of each of said devices with a phase variance of 180° in the energy supplied to each of the said input circuits of the tubes, means to supply the frequency modulated signalling voltages to the second input circuits of the said tubes cophasally, means including a serially connected capacity and resistance element for supplying voltage to the last named input circuits of the tubes with a 90° phase shift relative to the voltage supplied to the first named input circuits for conditions of equilibrium, means to produce phase variances from the normal 90° phase difference between the voltages applied to the said two input circuits of each of the tubes upon frequency changes in the supplied signalling voltages, and an output circuit responsive to the said 90° phase shift variances in the voltages supplied to the said input circuits.

3. A detector circuit comprising an energy transfer means having outer terminals whereat, upon excitation, voltages are developed which are out-of-phase with respect to each other, a center tap connection to the said energy transfer means, a series circuit connected in shunt with the said energy transfer means and between the outer terminals thereof, said series circuit comprising a resistance and a capacity element of which the capacitive reactance of the condenser is equal to the resistance of the resistor at a predetermined output frequency of the said energy transfer means, an output connection at the junction point of the said resistance and condenser elements whereby, for predetermined impressed frequency values on the said energy transfer means, a voltage is developed between the said center tap connection and the output connection to the junction of the condenser and resistor which is 90° out-of-phase relative to each of the voltages developed between the said center tap connection and the outer terminals of said energy transfer means and at other frequencies the said voltage developed between the said center tap connection and the junction of the said resistance and condenser shifts closer or farther away from the said normally out-of-phase voltages at the outer terminal of the said energy transfer means.

4. A detector circuit including a pair of thermionic tubes each having an output electrode and at least two signal actuated control electrodes, means for applying frequency modulated signalling voltage in 180° out-of-phase relationship to like signal actuated control electrode elements of each of the said tubes, an electrical network comprising a series combination of a resistance element and a capacity element connected between said last named electrodes, said capacity and resistance elements being of such size that at a predetermined frequency the capacitive reactance of the capacity element is equal to the resistance of the resistance element, a connection to second like signal actuated control electrode elements of said tubes from the junction point of said capacity and resistance elements whereby, at a normally predetermined impressed frequency, the signal voltages applied to the two said control electrodes of the said tubes are 90° out-of-phase relative to each other, and at other frequencies the phase angle between the two said applied voltages increases and decreases in proportion to changes in frequency.

5. A detector circuit including a pair of thermionic tubes each having an output circuit and at least two signal actuated input circuits, means for applying frequency modulated signalling voltage in 180° out-of-phase relationship to like input circuits of each of the said tubes, an electrical network comprising a series combination of a resistance element and a capacity element connected in shunt with said last named input circuit, said capacity and resistance elements being of such size that, at a predetermined frequency, the capacitive reactance of the capacity element is equal to the resistance of the resistance element, a connection between the second like input circuit of said tubes and the junction point of said capacity and resistance elements, whereby at a normally predetermined impressed frequency the signal voltages applied to the two said input circuits of the said tubes are 90° out-of-phase relative to each other, and at other frequencies the phase angle between the two said applied voltages increases and decreases in proportion to changes in frequency and output voltages proportional to frequency changes are developed in the said output circuits.

6. A detector circuit including a pair of thermionic tubes each having an output electrode element and at least two signal actuated control electrodes, input connections to apply normally 180° out-of-phase voltages to a first like control electrode element of each tube, a phase shifting network comprising a serially connected capacity element and a resistance element connected between said first named like control electrode elements, a connection from each of the second like control electrode elements of each tube to the junction point of said serially connected capacity and resistance elements whereby, for conditions when the resistance of the said resistance element is equal to the capacitive reactance of the capacity element, a voltage is applied to the second like control electrode elements which is 90° out-of-phase relative to the first supply voltage and for other frequency values of impressed energy the relative phase difference varies substantially proportionally, thereby to produce output energy from the two said output electrode elements which is proportional to the change in frequency applied.

RICHARD C. WEBB.